United States Patent Office 3,446,568
Patented May 27, 1969

3,446,568
NITROANILINE DYES FOR DYEING HUMAN
HAIR AND ANIMAL FIBERS
Harris Holtzman, Staten Island, N.Y., and Milton H.
Schwarz, Westport, Conn., assignors to Revlon, Inc.,
New York, N.Y., a corporation of Delaware
No Drawing. Filed May 11, 1965, Ser. No. 454,999
Int. Cl. D06p 3/02, 5/00; A61k 7/12
U.S. Cl. 8—10
9 Claims

ABSTRACT OF THE DISCLOSURE

Dyestuffs of the formula

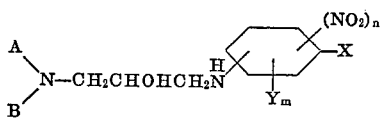

where X is

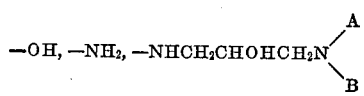

or

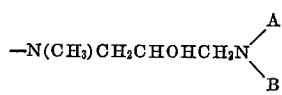

Y is chloro or lower alkoxy, A and B taken separately are hydrogen, lower alkyl, hydroxy lower alkyl, lower alkyloxy lower alkyl, or phenyl and one of A or B is other than hydrogen, and A and B together with the nitrogen atom to which they are attached may be morpholino, $m$ is 0 or 1, and $n$ is 1 or 2. Method of dyeing animal fibers or human hair with these dyestuffs.

---

The present invention relates to improved compositions for dyeing animal fibers, said compositions comprising nitroaniline dyestuffs, to such dyestuffs, and to methods of making the dyestuffs and dyeing animal fibers therewith, and relates in particular to compositions comprising N-substituted aminohydroxyalkyl derivatives of nitroaniline dyes having various nuclear substituents, to such dyes, and to methods of making the dyes and using the dyes to dye animal fibers.

A number of materials are known in the prior art for dyeing animal fibers, including wool and, particularly, human hair. Permanent dyes (the so-called "oxidation dyes"), such as paraphenylenediamine or the aminophenols, comprise substances which are combined with hydrogen peroxide to form the active dye by oxidation. Because of the small size of the molecules, these dyes have a good substantivity to hair. However, the presence of peroxide may be irritating to some users and the shades obtained in dyeing tend to vary with the time of oxidation of the dye relative to the time of its application to the hair.

Ready-formed dyestuffs suitable for hair coloring are generally larger, more complex, molecules which are less substantive to living hair at the low temperatures and short processing times generally preferred. These dyes are generally used as temporary hair rinses. If solubilizing groups are present in the dyes, such as sulfonic acid radicals in acid dyes or amino salts in basic dyes, staining of the scalp may occur. Further, the resistance of such solubilized dyes to shampooing is decreased.

Disperse dyes have been used to overcome the deficiencies of the highly soluble dyes. These dyes have a low solubility in water and are generally combined with large quantities of dispersing agents when applied. Although skin staining and sensitivity to washing are decreased by the use of disperse dyes, the substantivity of the dyes to living hair is still lower than desired, and the high ratios of dispersing agents required may interfere with absorption of the dye by hair. Various attempts have been made in the prior art to improve the solubility of disperse dyestuffs without imparting such strong solubility characteristics to the dyes as cause excessive skin staining.

For example, certain nitroaniline and nuclear substituted nitroaniline disperse dyes having small and relatively simple molecules which are readily absorbed by hair at low temperatures, and which are colored and do not require oxidation for color development, have been substituted with N-alkylol groups to improve their water solubility. Derivatives of this type are taught, for example, in U.S. Patents 2,750,326 and 2,750,327.

According to the present invention, improved dyeing compositions have been found which comprise novel nitroaniline dyestuffs, including nuclear substituted nitroanilines, which have been modified by the introduction of N-aminohydroxyalkyl groups. The new materials have an improved substantivity to hair, as compared with the prior art materials, particularly to gray hair. This improved substantivity appears to be associated with the presence of an amino group in the N-substituted side chain. Also, deeper bluish and violet shades can be obtained with certain dyes of the invention.

In general, the dyestuffs of the invention have the formula

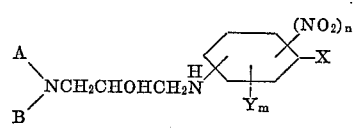

where X is —OH, —NH$_2$, —NHCH$_2$CHOHCH$_2$NAB, or —N(CH$_3$)CH$_2$CHOHCH$_2$NAB, Y is chloro or lower alkoxy, $n$ is 1 or 2, and $m$ is 0 or 1. A particularly interesting class of intensely bluish dyestuffs are those compounds in which X is —NHCH$_2$CHOHCH$_2$NAB or

—N(CH$_3$)CH$_2$CHOHCH$_2$NAB

In the formulas above, A is alkyl, aryl, hydroxyalkyl, or oxyalkyl, and B is hydrogen, alkyl, aryl, hydroxyalkyl, or oxyalkyl. Further, A plus B, taken together with the nitrogen atom to which they are attached, may be a morpholino ring.

The compounds of the present invention are formed by a two stage reaction. In the first stage, amino compounds of the formula

where Z is —OH, —NH$_2$, or —NHCH$_3$, and Y has the meaning given above, are reacted with epichlorohydrin with replacement of an active hydrogen atom in one or more of the amino groups present in the molecule. In this manner, N-substituted 2'-hydroxy-3'-chloropropyl groups are introduced into the molecule.

In a second stage, the chlorinated intermediate product is reacted with a primary or secondary amine to form the aminohydroxyalkyl dyestuffs of the present invention.

The reaction of the nitroaniline starting material with epichlorohydrin proceeds either in the presence of an excess of epichlorohydrin to promote the reaction of one hydrogen atom of each amino group present in the molecule, or in the presence of such a stoichiometric amount of epichlorohydrin as will react with the amino hydrogen atoms of one or a selected number of amino groups present in the molecule. In the latter case, the reaction is conveniently carried out in a solvent for the materials. When an excess of epichlorohydrin is reacted, the epichlorohydrin itself conveniently acts as a carrier or reaction medium. The epichlorohydrin reacts with a primary amine hydrogen in preference to the hydrogen atoms of secondary amino groups initially present or introduced into the molecule.

The reaction of the starting material with epichlorohydrin takes place preferably at temperatures between about 100° C. and about 150° C. When epichlorohydrin is employed in excess as the carrier, it is convenient to reflux the epichlorohydrin and starting material at the reflux temperature of about 120° C.–130° C. The refluxing is suitably continued until substantially all of the starting material has been converted. Alternatively, the reaction may be carried out in a solvent, conveniently in a solvent refluxing at the preferred temperatures indicated. Higher or lower temperatures may, of course, also be employed but side reactions may increase at elevated temperatures, and at lower temperatures the reaction may require long, economically unfeasible reaction times.

After removal of any excess epichlorohydrin which may be present, other than that which may be desired as a carrier for the intermediate product formed, the intermediate reaction product is reacted with a primary or secondary amine to form the dystuffs of the invention. The reaction with the amine suitably occurs at a temperature between about 60° C. and 150° C., preferably between about 80° C. and about 100° C. Although higher or lower temperatures can also be employed, the reaction is slow at temperatures below about 60° C., which detracts from the economic feasibility of the process. At temperatures much in excess of 110° C., there may be an increased occurrence of side reactions, although the principal product is still formed. Conveniently, the reaction is effected by heating the intermediate and the amine in a solvent refluxing in the preferred temperature range.

As the primary or secondary amines that are reacted, monoalkyl amines, monoalkanol amines, dialkyl amines, dialkanol amines, alkyl alkanolamines, cycloaliphatic amines, diaryl amines, and amines having both aryl and alkyl or alkanol substituents can be employed. Typical preferred materials are monoethanolamine, diethanolamine, and other lower mono- and dialkanolamines such as di-isopropanolamine. Representative of mixed alkyl alkanol materials are ethyl ethanolamine, n-butyl ethanolamine, and t-butyl ethanolamine. Oxyalkyl materials such as dimethoxyethylamine can be reacted as well as lower dialkyl amines such as diethylamine. The intermediates are also reactive with amines containing aryl groups, such as diphenylamine or phenylethanolamine. Morpholine is a preferred cycloaliphatic amine reactant.

In general, the amines have the formula HNAB, where A and B have the meanings given earlier above.

A better understanding of the present invention and of its many advantages will be had by referring to the following specific examples, given by way of illustration.

Example 1

15.35 gms. (0.1 mol) of o-nitro-p-phenylene diamine were sprinkled slowly into 92.5 gms. (1.0 mol) of epichlorohydrin. The mixture was heated gradually over a period of about 45 minutes to reflux temperature (118° C.–119° C.) and stirred under reflux for about 2 hours, during which time the temperature gradually rose to about 128° C.–129° C. The material was then slowly cooled to about 30° C.

Most of the excess epichlorohydrin was removed by vacuum distillation. About 0.65 mol of epichlorohydrin was recovered in this manner, leaving a quantity of unreacted epichlorohydrin to keep the intermediate product in a thin pasty form. Chromatographic analysis of the primary condensation product showed that the starting material, o-nitro-p-phenylene diamine, which has a red shade, had been completely converted into a violet dye in which one amino hydrogen on each of the two amino groups present had been substituted with a 2'-hydroxy-3'-chloropropyl group.

100 gms. of absolute alcohol were added to the intermediate product, and the intermediate was dispersed therein by stirring for about 15 minutes. An amount of monoethanolamine in excess of the epichlorohydrin remaining in the intermediate product in both combined and uncombined form, was next slowly added. The resulting mixture was then heated up to reflux temperature at about 80° C.–85° C. for 30 minutes, and refluxed for 3 hours to insure complete reaction. On removal of the alcohol, a thick, pasty violet mass was obtained. Chromatographic analysis showed the presence of a violet dye of increased water solubility as compared with the primary violet condensation product.

The new dye was separated chromatographically from small amounts of other colored products, as well as from excess monoethanolamine and colorless epichlorohydrin-monoethanolamine condensation products. The bluish-violet dyestuff was identified analytically as a di-substitution product of o-nitro-p-phenylene diamine containing one —CH$_2$CHOHCH$_2$NHCH$_2$CH$_2$OH residue substituted on each of the two amino groups present in the starting material.

A solution of the new dyestuff was made up in 20% aqueous alcohol at a 0.5% dye concentration and the pH adjusted to 7.2–7.3. Gray human hair was padded with this solution and allowed to stand at room temperature for 30 minutes, then rinsed with water, and shampooed. An intense violet coloration was imparted to the hair. The dyeing was stable to wet and dry rubbing.

By decreasing the reaction time to about one hour, a product containing significant amounts of the mono-substituted product

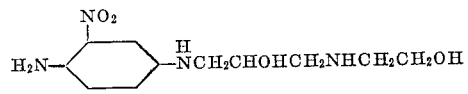

was obtained. The resulting dye mixture was redder in shade than the di-substituted product. The mono- and di-substituted products can be used together for dyeing purposes, or can be separated, for example by chromatography.

Example 2

The intermediate product obtained according to Example 1 was reacted with an excess of diethanolamine under the conditions of Example 1 to prepare a violet hair dye slightly redder in shade than the dyestuff of Example 1. The dye was also somewhat more soluble in water and aqueous alcohol, especially at higher dyestuff concentrations, and comprised two

residue.

One part by weight of the dye was mixed with 2 parts of alcohol and then added to a mixture of 7 parts of wetting agents in 90 parts of water. The resulting mixture imparted a strong red-violet shade to all types of white, bleached, and gray human hair, and to wool.

Example 3

The intermediate prepared as in Example 1 was also reacted in a second stage with an excess of morpholine. A violet dye, similar in shade to that of Example 2 was obtained. The dye was les soluble in aqueous alcoholic solutions than the dye of Example 1.

Example 4

The intermediate prepared by the reaction of o-nitro-p-phenylene diamine with excess epichlorohydrin was reacted with an excess of n-butyl ethanolamine using the procedure of Example 1. A violet dye slightly redder in shade than that obtained in Example 2 was formed. The solubility characteristics were intermediate to those of the dyes of Examples 1 and 3.

Example 5

A dyestuff of somewhat bluer shade than that of Example 4 and of somewhat better solubility was obtained by reacting the intermediate of Example 1 with excess t-butyl ethanolamine.

Example 6

The intermediate of Example 1 was reacted with di-isopropanolamine to produce a violet dye similar in shade to that of the dyestuff of Example 2, but with solubility characteristics intermediate to the dyes of Examples 1 and 2.

Example 7

The intermediate of Example 1 was reacted with ethyl ethanolamine to produce a violet dye slightly redder in shade than the dye of Example 1, and having solubility properties in aqueous alcoholic solutions intermediate to the properties of dyestuffs of Examples 1 and 6.

Example 8

Example 1 was repeated except that the intermediate product was reacted with di-methoxyethylamine, rather than with monoethanolamine. A violet dye, slightly bluer in shade than that of Example 1 was obtained. The solubility characteristics were intermediate to the dyestuffs of Examples 3 and 4.

Example 9

Example 1 was repeated but the intermediate product was condensed with diethylamine, rather than mono-ethanolamine. A violet dye similar in shade to the dye of Example 1 was obtained. The dye had less aqueous solubility than the dye of Example 3.

A dye of comparable solubility properties was obtained by the reaction of the intermediate of Example 1 with diphenylamine. A dye of increased solubility was obtained by the reaction of the intermediate of Example 1 with phenylethanolamine.

Example 10

15.35 gms. (0.1 mol) of p-nitro-o-phenylene diamine were reacted with an excess of epichlorohydrin according to the technique of Example 1 in place of o-nitro-p-phenylene diamine. The intermediate product obtained was condensed with monoethanolamine, as previously described. The resulting dyestuff was a reddish brown material.

Gray human hair, dyed with this dyestuff according to the technique taught in Example 1 imparted a reddish brown coloration of high color intensity to the hair. In contrast, if the p-nitro-o-phenylene diamine starting material is used as a dye, a golden yellow color is obtained.

Example 11

15.4 gms. of p-nitro-o-aminophenol were reacted as in Example 1 in place of o-nitro-p-phenylene diamine. The intermediate condensation product, when reacted with monoethanolamine, gave a dye which dyed gray human hair a light brown shade. The starting material, in contrast, imparts a reddish yellow shade to hair dyed therewith.

Example 12

19.9 gms. of 4,6-dinitro-o-aminophenol (picramic acid) were employed in the process of Example 1 in place of o-nitro-p-phenylene diamine. Reaction of the intermediate product obtained by condensation with an excess of epichlorohydrin with monoethanolamine gave a product which dyed gray human hair a warm deep reddish brown shade. The starting material, picramic acid, produces an auburn shade when employed as a hair dye.

Example 13

18.45 gms. of 2-nitro-5-methoxy-1,4-phenylene diamine were reacted with 92.5 gms. (1.0 mol) of epichlorohydrin as in Example 1. The resulting condensate was then reacted with diethanolamine with formation of a yellow brown dyestuff of the formula

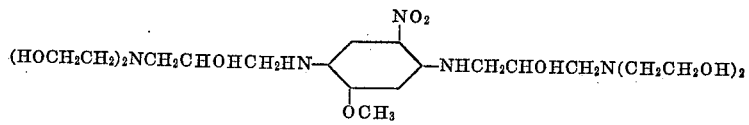

A 0.5% aqueous solution of the dye, containing 6% of emulsifying agents, dyes wool and all types of human hair a deep yellow-brown shade which is resistant to water.

Mixtures of the dye solution with varying amounts of the dye solution of Example 2 will dye wool or hair, at room temperature, different shades ranging from light ash blonde to dark beiges.

Similarly, 2-nitro-5-chloro-1,4-phenylene diamine can be reacted with epichlorohydrin and an amine to give a fast dye for hair.

Example 14

16.75 gms. (0.1 mol) of 2-nitro-4-methylaminoaniline were reacted with an excess of epichlorohydrin as in Example 1.

The intermediate product was then reacted with di-ethanolamine as in Example 1 with the formation of a violet dyestuff of the formula

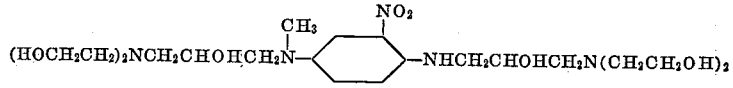

One part by weight of the dye was mixed with 2 parts of ethanol and 8 parts of emulsifiers, and was then diluted with 89 parts of water. The resulting solution was used at temperatures of up to 95° F. to dye hair and wool a deep violet shade.

What is claimed is:

1. A dyestuff adaptable to dyeing animal fibers and human hair and having the formula

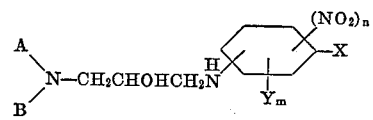

wherein X is a member selected from the group consisting of

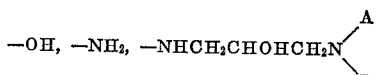

and

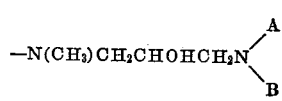

Y is a member selected from the group consisting of chloro and lower alkoxy, A is a member selected from the group consisting of lower alkyl, hydroxy lower alkyl, lower alkyloxy lower alkyl, and phenyl, B is a member selected from the group consisting of hydrogen, lower alkyl, hydroxy lower alkyl, lower alkyloxy lower alkyl, and phenyl, and A and B taken together with the nitrogen atom to which they are attached may be morpholino, $m$ is 0 or 1, and $n$ is 1 or 2.

2. A dyestuff adaptable to dyeing animal fibers and human hair, and having the formula

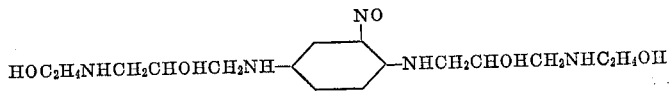

3. A dyestuff adaptable to dyeing animal fibers and human hair, and having the formula

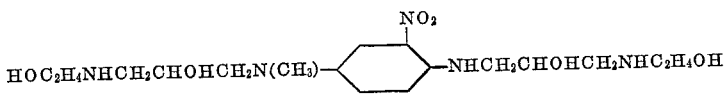

4. A dyestuff adaptable to dyeing animal fibers and human hair, and having the formula

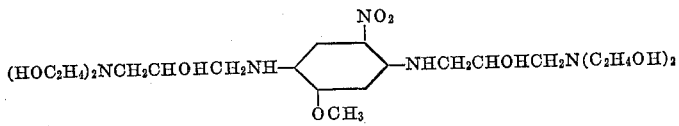

5. A composition for dyeing animal fibers and human hair, which composition comprises an aqueous solution of an effective amount of a dyestuff as in claim 1.

6. A composition for dyeing animal fibers and human hair, which composition comprises an aqueous solution of an effective amount of a dyestuff as in claim 2.

7. A composition for dyeing animal fibers and human hair, which composition comprises an aqueous solution of an effective amount of a dyestuff as in claim 3.

8. A composition for dyeing animal fibers and human hair, which composition comprises an aqueous solution of an effective amount of a dyestuff as in claim 4.

9. The method of dyeing animal fibers and human hair which comprises treating the same with an aqueous solution of an effective amount comprising at least one dyestuff of the formula

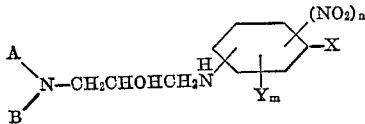

wherein X is a member selected from the group consisting of

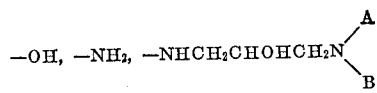

and

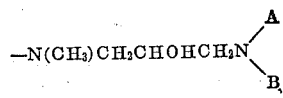

Y is a member selected from the group consisting of chloro and lower alkoxy, A is a member selected from the group consisting of lower alkyl, hydroxy lower alkyl, lower alkyloxy lower alkyl, and phenyl, B is a member selected from the group consisting of hydrogen, lower alkyl, hydroxy lower alkyl, lower alkyloxy lower alkyl, and phenyl, and A and B taken together with the nitrogen atom to which they are attached may be morpholino, $m$ is 0 or 1, and $n$ is 1 or 2.

References Cited
UNITED STATES PATENTS

| | | | |
|---|---|---|---|
| 2,750,326 | 6/1956 | Eckardt | 167—88 |
| 2,750,327 | 6/1956 | Eckardt | 167—88 |
| 3,049,393 | 8/1962 | Seemuller | 167—88 X |
| 3,190,883 | 6/1965 | Geschickter et al. | 260—247.5 X |

ALBERT T. MEYERS, *Primary Examiner.*

VERA C. CLARKE, *Assistant Examiner.*

U.S. Cl. X.R.

8—10.1, 11; 260—247.5, 570.5

PO-1050
(5/69)

UNITED STATES PATENT OFFICE
CERTIFICATE OF CORRECTION

Patent No. 3,446,568　　　　　　　　　Dated May 27, 1969

Inventor(s) Harris Holtzman and Milton H. Schwarz

It is certified that error appears in the above-identified patent and that said Letters Patent are hereby corrected as shown below:

Column 7, Claim 2, that portion of the formula reading $NO$　　should read　　$NO_2$

SIGNED AND
SEALED
NOV 18 1969

(SEAL)
Attest:

Edward M. Fletcher, Jr.
Attesting Officer

WILLIAM E. SCHUYLER, JR.
Commissioner of Patents